Patented July 20, 1954

2,684,303

UNITED STATES PATENT OFFICE 2,684,303

HIGH REFLECTANCE QUICK-DRYING MARKING INKS

John M. Leonard, Chevy Chase, Md., and Constance E. Patouillet, Washington, D. C., assignors to the United States of America as represented by the Secretary of the Navy No Drawing. Application June 25, 1953, Serial No. 364,222

3 Claims. (Cl. 106—25)

This invention relates to new quick-drying marking inks of high reflectance which are suitable for inscribing on glass or clear solid plastic surfaces.

The automatic recording of data on glass or on clear solid plastic surfaces has presented a demand for a marking ink which shall be quick-drying, of high reflectance, quickly and easily removed from the glass or plastic surface for alteration of the record or the making of a new one, and free-flowing in a pen of the Inkograph type.

We have found that marking inks which possess all of the foregoing requisite and valuable properties and which are suitable for use in automatic recording of data on glass or on clear solid plastic surfaces can be obtained by dispersing titanium dioxide as the pigment in a water solution of dextrin as the binder to which gum tragacanth is added as a thickener and bentonite as an antisettling agent for the pigment. Where the marking ink is to be used for inscribing on the surface of a clear solid plastic such as Lucite (polymethyl methacrylate) the use of a wetting agent in the ink is necessary. The presence of a wetting agent in the marking inks which are intended for inscribing on glass surfaces is recommended in view of the fact that usually such surfaces are not clean but are coated with a greasy film. The use of Carbitol (diethyleneglycol monomethyl ether) in the inks is also recommended, although not necessary to the functioning of the same, since it improves the flowing properties of the ink in the pen.

The marking inks of the present invention can be prepared by dissolving the dextrin in the calculated amount of water and adding the titanium dioxide and bentonite to the dextrine solution in a conventional type ball mill commonly used for preparing inks. The bentonite may be added before or with the pigment. These ingredients are brought to a smooth suspension by working in the ball mill, provided with flint pebbles as the grinding aid. The gum tragacanth is then added and worked into the ink in the ball mill. The wetting agent, the Carbitol and the microbicide are also added to the ink in the ball mill at this time. Microbicides are used in the inks to protect the dextrin.

The ratio of pigment to binder in the marking inks is defined by rather narrow limits in order to obtain an ink which on the one hand is quick-drying and quickly and easily removed from the glass or solid plastic surface and on the other is not friable and crumbly to the touch. Suitable pigment to binder ratios are from about 2¼ to 2¾ parts by weight of the pigment to 1 part by weight of the binder in which is included in addition to the dextrin, the relatively small proportion of gum tragacanth. The gum tragacanth is employed as a thickener in place of further amounts of the dextrin whereby to avoid excessively high binder to pigment ratios and the formation of smearable inscriptions on the surface of the glass, etc. A preferred ratio of pigment to binder is about 2½ parts by weight of the former to 1 part by weight of the latter.

The titanium dioxide may be present in the inks in proportions of from about 18 to 22% by weight, the dextrin in proportions of from about 7 to 10% by weight, the bentonite in proportions of about 0.9 to 1.1% by weight, the gum tragacanth in proportions of about 0.2 to 0.4% by weight and the Carbitol in proportions of from about 1.5 to 2.5% by weight, the remainder being water and a small proportion of a wetting agent to assist wetting of the plastic or glass surface by the ink, of the order of 0.05% by weight, and a small amount of a microbicide to protect the dextrin, of the order of 0.05% by weight. A suitable wetting agent is, for example, Aerosol OT (dioctyl ester of sodium sulfosuccinic acid) or Tergitol Penetrant 4 (7-ethyl-2-methyl-4-undecyl sodium sulfate). As a microbicide there may be used, for example, a combination of the bis-chlorophenols sold under the trade-names of G-4 and G-11 which are, respectively, 2,2'-dihydroxy-4,4'-dichloro-diphenylmethane and 2,2'-dihydroxy-3,3',5,5',6,6'-hexachlorodiphenyl-methane.

The use of bentonite in the new marking inks imparts marked thixotropic properties thereto and confers thereon a relatively high viscosity for preventing settling of the pigment while at the same time permitting free flow of the ink in the pen when applied for inscribing.

The new marking inks of the invention are typified by the ink of the following formula:

| | | |
|---|---|---|
| Water | ml | 4,000 |
| Dextrin | grams | 480 |
| Bentonite | do | 60 |
| Titanium dioxide | do | 1,200 |
| Gum tragacanth | do | 20 |
| Carbitol | ml | 120 |
| Aerosol OT | grams | 4 |
| G-4 | do | 2 |
| G-11 | do | 2 |

The ink of the above formula represents an excellent quick-drying white marking ink of high reflectance which has a 30 seconds drying time on glass and Lucite, is non-smearing thereon and is easily and quickly removable therefrom when dry. This ink, moreover, has very good flow properties in a pen of the Inkograph type.

While in the foregoing description we have made reference to a particular embodiment of the invention, it is to be understood that the same is intended by way of illustration and not in limitation of the invention, the scope of which is defined by the appended claims.

The invention described herein may be manufactured and used by or for the Government of the United States of America for governmental purposes without the payment of any royalties thereon or therefor.

We claim:

1. A high reflectance, quick-drying marking ink suitable for inscribing on glass and clear solid plastic surfaces which comprises a dispersion of from about 18 to about 22% by weight titanium dioxide in a water solution of from about 7 to about 10% by weight dextrin in which the weight ratio of the titanium dioxide to the dextrin is between about 2¼ and about 2¾ to 1, said dispersion being thickened with from about 0.2 to about 0.4% by weight gum tragacanth and with from about 0.9 to about 1.1% by weight bentonite and further containing from about 1.5 to about 2.5% by weight diethyleneglycol monomethyl ether and a small amount of a microbicide and of a wetting agent.

2. A high reflectance, quick-drying marking ink as defined in claim 1, wherein the weight of titanium dioxide to dextrin is about 2½ to 1.

3. A high reflectance, quick-drying marking ink suitable for inscribing on glass and clear solid plastic surfaces which comprises a dispersion of about 20% by weight titanium dioxide in a water solution of about 8% by weight dextrin in which the weight ratio of the titanium dioxide to the dextrin is about 2½ to 1, said dispersion being thickened with about 0.3% by weight gum tragacanth and with about 1% by weight bentonite and further containing about 2% by weight diethyleneglycol monomethyl ether and a small amount of a microbicide and of a wetting agent.

No references cited.